United States Patent
Suau

(10) Patent No.: US 9,803,038 B2
(45) Date of Patent: Oct. 31, 2017

(54) METHOD FOR SOLUTION-POLYMERISING (METH)ACRYLIC ACID

(71) Applicant: COATEX, Genay (FR)

(72) Inventor: Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/033,816

(22) PCT Filed: Nov. 26, 2014

(86) PCT No.: PCT/FR2014/053038
§ 371 (c)(1),
(2) Date: May 2, 2016

(87) PCT Pub. No.: WO2015/092186
PCT Pub. Date: Jun. 25, 2015

(65) Prior Publication Data
US 2016/0280817 A1    Sep. 29, 2016

(30) Foreign Application Priority Data

Dec. 20, 2013 (FR) ...................................... 13 63258

(51) Int. Cl.
*C08F 120/06* (2006.01)
*C08F 20/06* (2006.01)
*C08F 22/02* (2006.01)

(52) U.S. Cl.
CPC ............ *C08F 120/06* (2013.01); *C08F 20/06* (2013.01); *C08F 22/02* (2013.01)

(58) Field of Classification Search
CPC ....... C08F 20/06; C08F 120/06; C08F 220/06
See application file for complete search history.

(56) References Cited

U.S. PATENT DOCUMENTS

| 2,789,099 A | 4/1957 | Rife et al. |
| 4,339,473 A | 7/1982 | D'Agostino et al. |
| 9,150,722 B2 * | 10/2015 | Suau ....................... C08F 20/06 |
| 2007/0179262 A1 | 8/2007 | Suau et al. |
| 2011/0186773 A1 | 8/2011 | Suau et al. |
| 2012/0259083 A1 | 10/2012 | Suau et al. |

FOREIGN PATENT DOCUMENTS

WO    2005/095466 A1    10/2005

OTHER PUBLICATIONS

International Search Report dated Feb. 11, 2015 in PCT/FR14/053038 Filed Nov. 26, 2014.

* cited by examiner

*Primary Examiner* — Rip A Lee
(74) *Attorney, Agent, or Firm* — Oblon, McClelland, Maier & Neustadt, L.L.P.

(57) ABSTRACT

The present invention relates to a novel method for preparing a (meth)acrylic acid polymer in an aqueous solution, said polymer having a molecular mass lower than 8000 g/mol, for example using copper carbonate and iron sulphate (or the derivatives thereof).

17 Claims, No Drawings

METHOD FOR SOLUTION-POLYMERISING (METH)ACRYLIC ACID

FIELD OF THE INVENTION

The present invention relates to the technical field of the radical polymerization of (meth)acrylic acid. More precisely, the present invention relates to a novel radical polymerization process, to the polymers thus obtained and to their industrial applications.

BACKGROUND OF THE INVENTION

Various radical polymerization processes exist.

Mention may be made first of methods that use organic solvents such as secondary alcohols, for instance isopropanol. These methods are nowadays unsatisfactory since they generate volatile organic compounds (VOC).

Firstly, it is necessary to remove these solvents at the end of reaction, which has the effect of complicating the industrial process for preparing the polymer.

Secondly, the effects on health and on the environment of these solvents are known to be very detrimental, and as such it is sought to avoid producing any. Finally, even after purification (distillation), there are still traces of solvent in the polymer solution.

Other methods exist for synthesizing polyacrylic polymers, which take place in water and do not generate volatile organic compounds.

Among the various radical polymerization processes, mention may also be made of the controlled radical polymerization of RAFT type (reversible addition fragmentation chain transfer) which makes it possible to perform the living polymerization of a monomer. Such a process also makes it possible to obtain polymers that have low polydispersity indices PI (also known as the polymolecularity index), which makes them particularly efficient for certain applications.

To perform a controlled radical polymerization of RAFT type, and thus to obtain a polymer of expected molecular mass which has a good PI index, it is important to introduce into the reaction medium an available amount of chain-transfer agent, in other words to use an amount of chain-transfer agent such that each chain to be polymerized is functionalized with a chain-transfer agent. In addition, it is important for this chain-transfer agent to be available from the outset when the polymerization is initiated, i.e. when the polymerization reactor is heated and radicals are generated. This implies that large amounts of chain-transfer agent must be used in a controlled radical polymerization process of RAFT type.

Despite all the advantages resulting from a RAFT polymerization, the use of such amounts of chain-transfer agent present a certain number of drawbacks.

Firstly, it turns out that chain-transfer agents are expensive products, which has an appreciable impact on the cost of the polymer obtained.

Furthermore, when sulfur-containing chain-transfer agents as described in documents WO 02/070571, WO 2005/095466 and WO 2006/024706 are used, it is found that a fraction of these compounds will be degraded into free sulfur-containing byproducts such as $CS_2$ and $H_2S$, and will be found in the final aqueous polymer solution and in the process drain waters, which may thus have a negative impact on man and on the environment. In addition, the presence of these sulfur-containing byproducts in the aqueous solution gives rise to the evolution of gases that are harmful to humans when the polymer is used.

Alternative methods to controlled radical polymerization of RAFT type exist. According to one of these methods, hydrogen peroxide is used, which acts as initiator, along with, for example, copper sulfate which acts as catalyst and chain-transfer agent. However, to arrive at a polymer which has a molecular mass of less than 8000 g/mol, for example about 6000 g/mol, it is necessary to use large amounts of catalyst, which gives rise to large amounts of pollutant byproducts.

Alternatively, thiolactic acid is used, or another mercaptan RSH, as additional chain-transfer agent, but, once again to obtain a polymer which has a molecular mass of less than 8000 g/mol, for example about 6000 g/mol, large amounts of thiolactic acid or, more generally, of transfer agent need to be used. Yet other processes make use of sodium-hypophosphite, of chemical formula $NaPO_2H_2$, as chain-transfer agent and redox agent, in the presence of hydrogen peroxide or of a radical generator. GB 771 573 A1 especially describes such a process. This has the major drawback of requiring large amounts of sodium hypophosphite, one fraction of the phosphorus becoming grafted into the polymer, another fraction of the phosphorus being found in the form of phosphorus salts in the process waters. This constitutes, firstly, a drawback when the polymer is used and, secondly, a pollutant for the environment.

BRIEF DESCRIPTION OF THE INVENTION

One object of the present invention is to propose a process for preparing a (meth)acrylic acid polymer with a molecular mass of less than 8000 g/mol, for example less than 7000 g/mol, this process making it possible to obtain an aqueous polymer solution that contains fewer byproducts of carbon sulfide $CS_2$ or hydrogen sulfide $H_2S$ type, so as to reduce the risks to humans and to the environment during the synthesis of the polymer, but also during the use of the polymer solution.

Yet another object of the present invention is to reduce the amount of pollutants in the process waters, associated with the use of reagents comprising sulfur and phosphorus.

Another object of the present invention is to propose a solvent-free process for preparing a polyacrylic polymer, i.e. a process which does not generate any volatile organic compounds.

Yet another object of the present invention is to propose a process for manufacturing a polymer with a good PI index while at the same time controlling the costs associated with the process.

Another object of the present invention is to propose a process for manufacturing an aqueous polymer solution that contains few unpolymerized monomers.

The inventor has developed a novel process for preparing, without solvent other than water, a (meth)acrylic acid polymer in solution, said polymer having a molecular mass of less than 8000 g/mol. This process is based especially on the preparation of a copper acrylate, copper methacrylate or copper maleate monomer using, for example, copper carbonate, or a derivative thereof, followed by using this special monomer during the polymerization of the (meth)acrylic acid monomers. According to this process, the use of a sulfur-containing chain-transfer agent as described in WO 02/070571, WO 2005/095466 and WO 2006/024706 is no longer necessary. The process that is the subject of the present invention is consequently novel relative to the French patent application published under the number FR 2

995 899 and also relative to the French patent application filed on 26 Nov. 2013 under the number 13 61631, which is as yet unpublished.

Polymerization Process:

Thus, a first subject of the present invention relates to a process for preparing a (meth)acrylic acid polymer in aqueous solution, said polymer having a molecular mass of less than 8000 g/mol comprising the following steps:
 a) a copper (meth)acrylate and/or a copper maleate is prepared in a synthesis reactor,
 b) an iron salt, for example iron sulfate or a hydrated derivative thereof, is introduced into the reactor,
 c) the reactor is heated to a temperature of at least 60° C.,
 d) the following compounds are introduced into the reactor, continuously and simultaneously:
  d1) the (meth)acrylic monomer(s) to be polymerized,
  d2) a polymerization initiator system, for example hydrogen peroxide.

The process for preparing the polymer takes place in aqueous solution. Thus, the process of the present invention comprises, besides the steps mentioned above, a step of introducing water into the synthesis reactor.

This introduction of water is generally the first step performed in the process that is the subject of the present invention.

Step a) of the process according to the invention consists in preparing a certain amount of a "special monomer", namely copper acrylate, copper methacrylate and/or copper maleate. It may be a mixture of special monomers, for example in acrylate or diacrylate, methacrylate or dimethacrylate, maleate or dimaleate form, taking into account the ionicity of the copper in aqueous solution. To prepare this special monomer, acrylic acid, methacrylic acid and/or maleic acid monomers are introduced into the synthesis reactor, along with a compound comprising copper atoms, for example copper carbonate or a derivative thereof. The term "copper carbonate or derivative" or "compound of copper carbonate type" means the compound $CuCO_3$ or any other derivative, for example $CuCO_3.Cu(OH)_2$. Mention is also made, for example, of malachite $(Cu_2(OH)_2CO_3)$ and azurite/chessilite $(Cu_3(OH)_2(CO_3)_2)$. In other words, a compound of copper carbonate type is a compound which comprises at least one copper atom and which becomes dissolved and degraded once in water and under acidic conditions. Thus, such a compound cannot be considered as a catalyst, which, by definition, returns to its initial form after reaction. The acidic monomer (acrylic acid, methacrylic acid and/or maleic acid) must be in excess relative to the compound comprising copper atoms, so that all of the $Cu^{2+}$ ions of this compound are in solvated form.

All the aspects of the present invention described below may be considered alone or in combination.

According to step b) of the process, which may be simultaneous with step a), an iron salt is added to the synthesis reactor.

The term "iron salt" means, for example, the compound $FeSO_4$ or any other hydrated derivative, for example $FeSO_4.7H_2O$.

The process of the invention is based, specifically, on the combined use of "special copper monomers" (copper acrylate, copper methacrylate and/or copper maleate) and an iron salt (for example $FeSO_4$ or a hydrated derivative thereof). The inventor realized, and demonstrates below, that the simultaneous use of these two compounds makes it possible to prepare (meth)acrylic acid polymers, without the need to use a sulfur-containing chain-transfer agent, such as those described in WO 02/070571, WO 2005/095466 and WO 2006/024706.

Thus, the process of the invention makes it possible to reduce the contamination of the polymer obtained, and also the production of pollutant byproducts such as $CS_2$ or $H_2S$, since none of these sulfur-containing agents is employed.

It moreover makes it possible to considerably reduce the cost of preparing the poly(meth)acrylic polymer.

The process of the present invention makes it possible to solve one of the major technical problems of the present invention, namely that of proposing a process for preparing a (meth)acrylic acid polymer with a molecular mass of less than 8000 g/mol, for example less than 6000 g/mol.

It should be noted, in addition, that the process of the invention is a process which does not use any solvent such as secondary alcohols, for instance isopropanol or any other solvent liable to generate volatile organic compounds (VOC). The process of the present invention is, precisely, performed without organic solvent. The term "solvent" or "organic solvent" means any substance that is inert toward the reagents and reaction products in liquid phase at its working temperature, the function of which is to dilute other substances without chemically modifying them and without itself being modified.

It also makes it possible to dispense with the chain-transfer agents, which are well known to those skilled in the art, such as mercaptans and alkyl halides.

According to the present invention, the (meth)acrylic acid polymer in solution obtained by polymerization, according to the process described above, has a molecular mass of less than 8000 g/mol. According to one embodiment, it also has a polydispersity index PI of between 2 and 3.

Polymers are generally characterized by two indices/magnitudes/values:
 the polymolecularity index PI (also equivalently known as the polydispersity index PD); and
 the molecular mass (also equivalently known as the molar mass or molecular weight), expressed in g/mol.

The polymolecularity index corresponds to the molar mass distribution of the various macromolecules in the (meth)acrylic acid polymer. If all the macromolecules have the same length (and thus the same molecular mass), this index is close to 1. If, on the other hand, the macromolecules have different lengths (thus different molecular masses), the PI index is greater than 1. The closer the PI index of the polymer is to 1, the more efficient this polymer is in its various applications.

However, it may prove to be very expensive to obtain a (meth)acrylic acid polymer with a PI index close to 1. The process of the present invention makes it possible to obtain a (meth)acrylic acid polymer with a good PI index while at the same time controlling the costs associated with the process.

According to one embodiment, this PI index is between 2 and 3.

According to step c) of the process that is the subject of the present invention, the synthesis reactor is heated to a minimum temperature of 60° C. before introducing the monomers to be polymerized.

According to one aspect of the present invention, the reactor is heated to a temperature of at least 80° C., for example to 95° C.

A temperature of at least 60° C., for example 85° C. or 90° C., is maintained throughout the polymerization step d).

The polymerization step d) requires the use of a polymerization-initiating system. The term "polymerization-initiating system" or "polymerization initiator system" means a system that is capable of initiating the polymerization of monomers. It is conventionally a chemical compound that has the capacity of generating free radicals.

According to one aspect of the present invention, the polymerization-initiating system is chosen from the group consisting of hydrogen peroxide, sodium persulfates, potassium persulfates, ammonium persulfates, hydroperoxides and a mixture of at least two of these compounds.

According to another aspect of the present invention, the polymerization-initiating system used in step d2) is hydrogen peroxide, also known as $H_2O_2$.

According to one aspect of the present invention, step a) of the process consists in introducing into a synthesis reactor:
  a1) water,
  a2) copper carbonate $CuCO_3$, or a derivative thereof, and
  a3) (meth)acrylic acid or maleic acid, in molar excess relative to compound a2).

This step leads to the preparation of a copper (meth)acrylate and/or a copper maleate in the synthesis reactor.

The term "copper (meth)acrylate" means a copper acrylate and/or a copper methacrylate.

(Meth)acrylic acid or maleic acid is in molar excess relative to compound a2), so that all of the copper atoms of compound a2) are in ionized form in the synthesis reactor.

According to another aspect of the invention, the mass percentage (weight/weight) between the copper (meth)acrylate or the copper maleate, obtained in step a), and said (meth)acrylic monomer(s) to be polymerized, according to step d), is between 0.5 and 5%, for example between 1% and 4%, or between 1.5% and 3%.

According to another aspect of the invention, the mass percentage (weight/weight) between the iron salt, for example iron sulfate, or a hydrated derivative thereof, and said (meth)acrylic monomer(s) to be polymerized is between 0.01% and 3%, for example between 0.03% and 1%, or between 0.05% and 0.5%.

According to yet another aspect, the process of the invention is such that:
  steps a) and b) are simultaneous,
  copper carbonate $CuCO_3$, or a derivative thereof, is used to prepare said copper (meth)acrylate or said copper maleate,
  said iron salt is an iron sulfate or a hydrated derivative thereof.

The present invention also relates to a process for preparing a (meth)acrylic acid polymer in aqueous solution, said polymer having a molecular mass of less than 8000 g/mol, comprising the following steps:
  A) the following are introduced into a synthesis reactor:
    A1) water,
    A2) copper carbonate $CuCO_3$, or a derivative thereof,
    A3) (meth)acrylic acid or maleic acid, and
    A4) iron sulfate $FeSO_4$, or a hydrated derivative thereof,
  B) the reactor is heated to a temperature of at least 60° C.,
  C) the following compounds are introduced into the reactor, continuously and simultaneously:
    C1) the (meth)acrylic monomer(s) to be polymerized,
    C2) a polymerization-initiating system.

According to another aspect of this subject of the present invention, the mass percentage (weight/weight) between the copper carbonate, or a derivative thereof, and said (meth)acrylic monomer(s) to be polymerized is between 0.01% and 3%, for example between 0.03% and 1%, or between 0.05% and 0.5%.

According to another aspect of the present invention, the mass ratio between the copper carbonate, or a derivative thereof, and the iron sulfate, or a hydrated derivative thereof, ranges between 1:4 and 10:1, for example between 1:3 and 4:1.

According to one aspect of the present invention, said process is such that no compound of chain-transfer agent type is added to the reactor, for example no compound of formula (I):

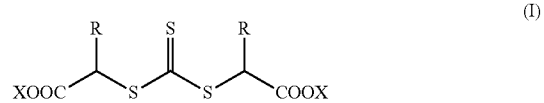

according to which:
  X represents Na, K or H, and
  R represents an alkyl chain comprising from 1 to 5 carbon atoms.

According to another aspect of the present invention, said process is especially such that no dipropyl trithiocarbonate (DPTTC, CAS No.6332-91-8) or salt thereof is added to the reactor, for example the disodium salt thereof (sodium trithiocarbonate dipropionate, CAS No. 86470-33-2, Mw=298.31 g/mol), as represented by formula (IV) below:

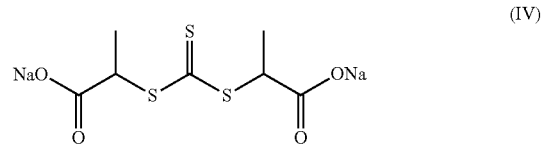

According to yet another aspect of the present invention, the reaction conditions are such that the degree of conversion of the monomers to be polymerized is greater than 99%.

The amount of residual monomers (acrylic acid or methacrylic acid) may be evaluated by high-pressure liquid chromatography (HPLC). In this method, the constituent components of the mixture are separated on a stationary phase, and detected by a UV detector. After calibrating the detector, it is possible, from the area of the peak corresponding to the acrylic compound, to obtain the amount of residual (meth)acrylic acid.

This method is described especially in the manual "Chimie Organique Expérimentale [Experimental Organic Chemistry]" by M. Chavanne, A. Julien, G. J. Beaudoin, E. Flamand, second edition, published by Modulo, chapter 18, pages 271-325.

According to another aspect of the present invention, the reaction conditions are such that the degree of conversion of the monomers to be polymerized is greater than 99.5%. In this case, the amount of residual monomers is less than 0.5% or less than 5000 ppm.

According to another aspect of the present invention, the reaction conditions are such that the degree of conversion of the monomers to be polymerized is greater than 99.7%. In this case, the amount of residual monomers is less than 0.3% or less than 3000 ppm.

According to another aspect of the invention, the process does not comprise any step for removing the reaction byproducts after the polymerization step d).

Uses:

Another subject of the present invention relates to the use of copper carbonate $CuCO_3$, or a derivative thereof, for preparing a (meth)acrylic acid polymer in solution, said polymer having a molecular mass of less than 8000 g/mol.

The present invention also relates to the combined use of copper carbonate $CuCO_3$, or a derivative thereof, and iron sulfate $FeSO_4$, or a derivative thereof, for preparing a (meth)acrylic acid polymer in solution, said polymer having a molecular mass of less than 8000 g/mol.

According to one embodiment of these uses, the mass percentage (weight/weight) between the copper carbonate or a derivative thereof and the (meth)acrylic monomer(s) to be polymerized is between 0.01% and 3%, for example between 0.03% and 1%, or between 0.05% and 0.5%.

According to one embodiment of these uses, the mass percentage (weight/weight) between the iron sulfate, or a hydrated derivative thereof, and said (meth)acrylic monomer(s) is between 0.01% and 3%, for example between 0.03% and 1%, or between 0.05% and 0.5%.

According to one embodiment of these uses, the mass ratio between the copper carbonate, or a derivative thereof, and the iron sulfate, or a hydrated derivative thereof, ranges between 1:4 and 10:1, for example between 1:3 and 4:1.

The present invention also relates to the use of a copper (meth)acrylate or a copper maleate for preparing a (meth) acrylic acid polymer in aqueous solution, said polymer having a molecular mass of less than 8000 g/mol of the monomers. Said polymer moreover has all the characteristics presented previously.

EXAMPLES

In each of the following examples, the molecular mass of the polymers according to the invention is determined by size exclusion chromatography (SEC) or gel permeation chromatography (GPC).

Such a technique uses a Waters™ brand liquid chromatography machine equipped with a detector. This detector is a Waters™ brand refractometric concentration detector.

This liquid chromatography apparatus is equipped with a size exclusion column appropriately chosen by a person skilled in the art so as to separate the various molecular weights of the polymers under study.

The liquid elution phase is an aqueous phase adjusted to pH 9.00 with 1 N sodium hydroxide containing 0.05 M of $NaHCO_3$, 0.1 M of $NaNO_3$, 0.02 M of triethanolamine and 0.03% of $NaN_3$.

In detailed manner, according to a first step, the polymerization solution is diluted to 0.9% by dry weight in the SEC dissolution solvent, which corresponds to the SEC liquid elution phase to which is added 0.04% of dimethylformamide which acts as flow marker or internal standard. Next, the solution is filtered through a 0.2 μm filter. 100 μL are then injected into the chromatography machine (eluent: an aqueous phase adjusted to pH 9.00 with 1N sodium hydroxide containing 0.05 M of $NaHCO_3$, 0.1 M of $NaNO_3$, 0.02 M of triethanolamine and 0.03% of $NaN_3$).

The liquid chromatography machine contains an isocratic pump (Waters™ 515) whose flow rate is set at 0.8 ml/min. The chromatography machine also comprises an oven, which itself comprises in series the following column system: a Waters™ Guard Column Ultrahydrogel precolumn 6 cm long and 40 mm in inside diameter, and a Waters™ Ultrahydrogel linear column 30 cm long and 7.8 mm in inside diameter. As regards the detection system, it is composed of an RI Waters™ 410 refractometric detector.

The oven is brought to a temperature of 60° C., and the refractometer is brought to a temperature of 45° C.

The chromatography machine is calibrated by means of sodium polyacrylate powder standards of different molecular masses certified by the supplier: Polymer Standard Service or American Polymer Standards Corporation.

The polydispersity index PI of the polymer is the ratio of the mass-average molecular mass Mw to the number-average molecular mass Mn.

The amount of residual monomers is measured according to standard techniques, known to those skilled in the art, for example by high-pressure liquid chromatography (HPLC).

Example 1

The object of this example is to illustrate the preparation of (meth)acrylic acid polymers according to the invention, by using:
  a dipropionate trithiocarbonate salt (DPTTC) or
  sodium hypophosphite,
  iron sulfate heptahydrate, $FeSO_4.7H_2O$ and/or copper carbonate in $CuCO_3.Cu(OH)_2$ form.

Test 1—Prior Art:

This test illustrates a process for preparing a polymer by means of a controlled radical polymerization of RAFT type.

328 g of water, 94 g of chain-transfer agent 29% DPTTC (i.e. 27 g of 100% DPTTC or 0.092 mol) are placed in a glass synthesis reactor equipped with a mechanical stirrer and heating of oil bath type.

The mixture is heated until it reaches a temperature of 95° C. 328 g of 100% acrylic acid (i.e. 4.558 mol) are added over 2 hours and also, in parallel:
  4 g of sodium persulfate $Na_2S_2O_8$ (i.e. 0.017 mol) dissolved in 76 g of water, and
  1.15 g of sodium metabisulfate $Na_2S_2O_5$ (i.e. 0.006 mol) dissolved in 76 g of water.

The temperature is then maintained for 2 hours, and 3.2 g of 130 V hydrogen peroxide diluted in 46 g of water are then injected.

The mixture is then neutralized by stirring with 381 g of 50% sodium hydroxide diluted in 48 g of water.

The mixture is heated for a further 1 hour at 95° C. and then allowed to cool to room temperature.

Test 2—Outside the Invention:

According to this test, the conditions of test 1 are reproduced, reducing by a factor of 10 the amount of chain-transfer agent DPTTC used.

328 g of water, 19 g of chain-transfer agent 14% DPTTC (i.e. 2.7 g of 100% DPTTC or 0.0092 mol) are placed in a glass synthesis reactor equipped with a mechanical stirrer and heating of oil bath type.

The mixture is heated until it has reached a temperature of 95° C.

328 g of 100% acrylic acid (i.e. 4.558 mol) are added over 2 hours and also, in parallel:
  4 g of sodium persulfate $Na_2S_2O_8$ (i.e. 0.017 mol) dissolved in 76 g of water, and
  1.15 g of sodium metabisulfite $Na_2S_2O_5$ (i.e. 0.006 mol) dissolved in 76 g of water.

The temperature is then maintained for 2 hours, and 3.2 g of 130 V hydrogen peroxide diluted in 46 g of water are then injected.

The mixture is then neutralized by stirring with 381 g of 50% sodium hydroxide diluted in 48 g of water.

The mixture is heated for a further 1 hour at 95° C. and then allowed to cool to room temperature.

Test 3—Prior Art:

This test corresponds to test 2 of example 2 of WO 2005/095466 (Coatex).

150 g of water, 20.31 g of chain-transfer agent 14.4% DPTTC (i.e. 2.92 g of 100% DPTTC) and 50 g of 100% acrylic acid are placed in the synthesis reactor equipped with a mechanical stirrer and heating of oil bath type. The source of free radicals is then added, in the present case 0.4 g of V501. The mixture is heated until it has reached a temperature of 95° C. The temperature is then maintained for 2 hours and the mixture is then allowed to cool to room temperature.

It is then neutralized with 55 g of 50% sodium hydroxide.

Test 4—Prior Art:

This test illustrates a process for preparing a polymer exclusively with sodium hypophosphite monohydrate.

209 g of water are placed in a synthesis reactor equipped with a mechanical stirrer and heating of oil bath type. 0.1 g of iron sulfate heptahydrate and 0.015 g of copper sulfate pentahydrate are added.

The medium is heated to 90° C. and the following are added simultaneously and continuously over 2 hours:

305 g of acrylic acid and 13 g of water,
19.6 g of 35% $H_2O_2$ and
25.6 g of $NaPO_2H_2.H_2O$ dissolved in 32 g of water.
The mixture is heated at 90° C. for 1 hour 30 minutes.

It is neutralized with 50% sodium hydroxide until a pH=8 is obtained.

Test 5—Invention:

245 g of water, 0.28 g of copper carbonate in the form $CuCO_3.Cu(OH)_2$, 5 g of acrylic acid and 0.27 g of iron sulfate heptahydrate are placed in a synthesis reactor equipped with a mechanical stirrer and heating of oil bath type.

The mixture is heated to 94° C., followed by simultaneous and continuous addition over 2 hours of:

35.3 g of 35% $H_2O_2$ diluted in 9.4 g of water and
274.9 g of acrylic acid.
The mixture is heated at 94° C. for 1 hour 30 minutes.

It is neutralized with 50% sodium hydroxide.

Test 6—Invention:

245 g of water, 0.28 g of copper carbonate in the form $CuCO_3.Cu(OH)_2$, 5 g of methacrylic acid and 0.31 g of iron sulfate heptahydrate are placed in a synthesis reactor equipped with a mechanical stirrer and heating of oil bath type.

The mixture is heated to 94° C., followed by simultaneous and continuous addition over 2 hours of:

35.3 g of 35% $H_2O_2$ diluted in 9.4 g of water and
274.9 g of acrylic acid.
The mixture is heated at 94° C. for 1 hour 30 minutes.

It is neutralized with 50% sodium hydroxide.

Test 7—Invention:

Identical to test 5 with 0.345 g of iron sulfate heptahydrate.

Test 8—Invention:

Identical to test 5 with 0.2415 g of iron sulfate heptahydrate.

Test 9—Invention:

Identical to test 5 with 0.414 g of iron sulfate heptahydrate.

Test 10—Invention:

Identical to test 5 with 0.552 g of iron sulfate heptahydrate.

Test 11—Outside the invention:

245 g of water, 0.28 g of copper carbonate in the form $CuCO_3.Cu(OH)_2$ and 10 g of acrylic acid are placed in a synthesis reactor equipped with a mechanical stirrer and heating of oil bath type.

The mixture is heated to 94° C., followed by simultaneous and continuous addition over 2 hours of:

35.3 g of 35% $H_2O_2$ diluted in 9.4 g of water and
269.9 g of acrylic acid.
The mixture is heated at 94° C. for 1 hour 30 minutes.

It is neutralized with 50% sodium hydroxide.

Test 12—Invention:

245 g of water, 0.34 g of copper carbonate in the form $CuCO_3.Cu(OH)_2$, 10 g of acrylic acid and 0.27 g of iron sulfate heptahydrate are placed in a synthesis reactor equipped with a mechanical stirrer and heating of oil bath type.

The medium is heated to 94° C., followed by simultaneous and continuous addition over 2 hours of:

35.3 g of 35% $H_2O_2$ diluted in 9.4 g of water and
269.9 g of acrylic acid.
The mixture is heated at 94° C. for 1 hour 30 minutes.

It is neutralized with 50% sodium hydroxide.

Test 13—Invention:

Identical to test 12 with 0.229 g of $CuCO_3.Cu(OH)_2$.

Test 14—Outside the invention:

245 g of water, 0.3 g of iron carbonate $FeCO_3$, 10 g of acrylic acid and 0.27 g of iron sulfate heptahydrate are placed in a synthesis reactor equipped with a mechanical stirrer and heating of oil bath type.

The medium is heated to 94° C., followed by simultaneous and continuous addition over 2 hours of:

35.3 g of 35% $H_2O_2$ diluted in 9.4 g of water and
269.9 g of acrylic acid.
The mixture is heated at 94° C. for 1 hour 30 minutes.

It is neutralized with 50% sodium hydroxide.

The results of the measurements taken on the polymers of the above tests are collated in tables 1 to 3 which follow.

TABLE 1

| Test No. | | Mass % DPTTC/ monomers | Mass % $NaPO_2H_2$/ monomers | Mw (g/mol) | PI | Solids content (%) | pH | Residual AA (%) |
|---|---|---|---|---|---|---|---|---|
| 1 | PA | 8.23 | na | 5065 | 1.5 | 36.6 | 9 | 0.13 |
| 2 | OI | 0.82 | na | 43 400 | 3.5 | 36.6 | 8.5 | 0.03 |
| 3 | PA | 5.8 | na | 4947 | 1.55 | 36.6 | 9 | 0.5 |
| 4 | PA | na | 7.0 | 4780 | 2.3 | 40.0 | 8.0 | 0.02 | na: not applicable

PA: prior art

OI: outside invention

TABLE 2

| Test No. | | Mass % CuCO$_3$•Cu(OH)$_2$/ monomers | Mass % FeSO$_4$•7H$_2$O/ monomers | CuCO$_3$•Cu(OH)$_2$/FeSO$_4$•7H$_2$O ratio | Mw (g/mol) | PI |
|---|---|---|---|---|---|---|
| 5 | INV | 0.1 | 0.1 | 1.04 | 5770 | 2.5 |
| 6 | INV | 0.1 | 0.11 | 0.91 | 7030 | 2.7 |
| 7 | INV | 0.1 | 0.12 | 0.83 | 5575 | 2.5 |
| 8 | INV | 0.1 | 0.09 | 1.18 | 7020 | 2.7 |
| 9 | INV | 0.1 | 0.15 | 0.69 | 6075 | 2.6 |
| 10 | INV | 0.1 | 0.20 | 0.52 | 5730 | 2.5 |
| 11 | OI | 0.1 | 0 | na | 11 105 | 3.1 | na: not applicable
INV: invention
OI: outside invention

TABLE 3

| Test No. | | Mass % CuCO$_3$•Cu(OH)$_2$/ monomers | Mass % FeSO$_4$•7H$_2$O/ monomers | CuCO$_3$•Cu(OH)$_2$/FeSO$_4$•7H$_2$O ratio | Mw (g/mol) | PI |
|---|---|---|---|---|---|---|
| 12 | INV | 1.12 | 0.1 | 1.24 | 7165 | 2.5 |
| 13 | INV | 0.08 | 0.1 | 0.83 | 7310 | 2.5 |
| 14 | OI | 0 + 0.1% FeCO$_3$ | 0.1 | na | 30 440 | 5.7 | na: not applicable
INV: invention
OI: outside invention

For all of the tests according to the invention, it is noted that the degree of conversion of the monomers to be polymerized is greater than 99.7% and that the content of residual monomers is largely less than 3000 ppm relative to the dry polymer.

Example 2

The object of this example is to illustrate the contents of carbon sulfide, of hydrogen sulfide and of phosphate ions of various samples using polymer solutions of the prior art or polymer solutions according to the present invention.

The analyses of the various samples are performed using an Agilent G1530 gas chromatograph coupled to an Agilent G2577A mass spectrometer as detector. Injection is performed using an Agilent G1888 headspace. An Agilent HP5 30 m×0.25 mm×1 μm column is used (5% phenyl and 95% methylsiloxane phase) which allows elution of the analyses.

The analysis is performed using 2 grams of the samples in native form. The quantification is performed by the dosed addition method.

The analyses of the various samples are also performed using a Metrohm 761 Compact IC ion chromatograph equipped with a conductimetric detector, a chemical suppressor and a CO$_2$ suppressor. A Metrohm Asupp5 250 anion-exchange column and two precolumns (Metrohm Asupp5 and RP) are used in order to elute the anions including HPO$_4^{2-}$.

The analysis is performed using 0.1 g of sample diluted in 60 g of distilled water.

The quantification is performed using external calibration.

Three syntheses are performed:
 a polyacrylic acid prepared by means of a controlled radical polymerization process of RAFT type, according to test 1 of example 1 above,
 a polyacrylic acid prepared by means of a polymerization process according to test 4 of example 1 above,
 a solution of polyacrylic acid polymer prepared by means of a process according to the present invention, according to test 5 of example 1 above.

Samples 1, 2 and 3 are obtained, respectively. All three samples are brought to a solids content of 36% by weight.

The results of analyses on these samples are collated in table 4 below.

TABLE 4

| Samples | INVention Prior Art | Content of HPO$_4^{2-}$ (ppm) | Content of SO$_4^{2-}$ (ppm) | Content of H$_2$S (ppm) | Content of CS$_2$ (ppm) |
|---|---|---|---|---|---|
| 1 | PA - RAFT | nd | 7758 | 200 | 1000 |
| 2 | PA - hypo | 5032 | 128 | nd | nd |
| 3 | INV | <50 | 257 | nd | nd | nd: not detectable

The analysis of sample 1, i.e. a polyacrylic acid obtained by means of a RAFT process, indicates large contents of sulfur-based byproducts SO$_4^{2-}$, H$_2$S and CS$_2$, which is a major drawback due to their toxicity.

The analysis of sample 2, i.e. a polyacrylic acid prepared by means of a process of the prior art with a high content of NaPO$_2$H$_2$, indicates a high content of residual HPO$_4^{2-}$ ions (5032 ppm).

The analysis of sample 3, namely a solution of polyacrylic acid polymer prepared by means of a process according to the present invention, shows that the contents of H$_2$S and CS$_2$ are not detectable. The content of phosphate ions is markedly less than that of sample 2.

The polymer obtained by means of the process of the invention offers a good compromise in terms of purity relative to the polymers obtained with RAFT or sodium hypophosphite processes.

The invention claimed is:

1. A process for preparing a (meth)acrylic acid polymer in aqueous solution, the process comprising:
   continuously and simultaneously introducing:
      at least one (meth)acrylic acid monomer to be polymerized, and
      a polymerization initiator into a reactor heated to a temperature temperature of at least 60° C. and comprising an iron salt or a hydrated derivative thereof and at least one of copper acrylate, copper methacrylate or copper maleate,
   to obtain a (meth)acrylie acid polymer having a molecular mass of less than 8000 mol.

2. The process of claim 1, further comprising preparing said at least one of copper acrylate, copper methacrylate or copper maleate by introducing into the reactor:
   a1) water,
   a2) copper carbonate $CuCO_3$, or a derivative thereof, and
   a3) at least one of (meth)acrylic acid or maleic acid prior to said continuously and simultaneously introducing said at least one (meth)acrylic acid monomer to be polymerized and said polymerization initiator into said reactor.

3. The process of claim 1, wherein a mass percentage of the at least one of copper acrylate, copper methacrylate or copper maleate relative to the at least one(meth)acrylic acid monomer to be polymerized is between 0.5% and 5%.

4. The process of claim 1, wherein a mass percentage of the iron salt, or hydrated derivative thereof, relative to the at least one (meth)acrylic acid monomer to be polymerized is between 0.01% and 3%.

5. The process of claim 1, wherein no chain-transfer agent is added to the reactor.

6. The process of claim 1, wherein the process does not include any step of removing reaction byproducts after polymerization occurs.

7. The process of claim 1, wherein a degree of conversion of the at least one (meth)acrylic acid monomer to be polymerized is greater than 99%.

8. The process of claim 1, wherein the reactor comprises no nonaqueous solvent.

9. The process of claim 1, wherein the iron salt or hydrated derivative thereof is an iron sulfate or a hydrated derivative thereof.

10. The process of claim 1, wherein the process provides a (meth)acrylic acid polymer having a molecular mass of less than 6000 g/mol.

11. The process of claim 1, wherein the (meth)acrylic is acid polymer has a polydispersity index PI of between 2 and 3.

12. The process of claim 2, further comprising:
   simultaneously introducing the iron salt, or hydrated derivative thereof, and components a1), and a2) and a a3) into the reactor prior to said continuously and simultaneously introducing said at least one (meth) acrylic acid monomer to be polymerized and said polymerization initiator into said reactor, wherein
   the iron salt or hydrated derivative thereof is an iron sulfate or a hydrated derivative thereof.

13. The process of claim 12, wherein a mass ratio between the copper carbonate, or derivative thereof, and the iron sulfate, or hydrated derivative thereof, ranges between 1:4 and 10:1.

14. The process of claim 2, wherein the reactor comprises no nonaqueous solvent.

15. The process of claim 2, wherein the copper carbonate derivative is selected from the group consisting of $CuCO_3.Cu(OH)_2$, $(Cu_2(OH)_2CO_3)$ and $(Cu_3(OH)_2(CO_3)_2)$.

16. The process of claim 2, wherein the process provides a (meth)acrylic acid polymer having a molecular mass of less than 6000 g/mol.

17. The process of claim 2, wherein the (meth)acrylic acid polymer has a polydispersity index PI of between 2 and 3.

* * * * *